United States Patent [19]
Ernst et al.

[11] Patent Number: 5,696,318
[45] Date of Patent: Dec. 9, 1997

[54] AIR INTAKE FOR AN INTERNAL COMBUSTION ENGINE

[75] Inventors: Volker Ernst, Sachsenheim; Rudolf Leipelt, Marbach, both of Germany

[73] Assignee: Filterwerk Mann & Hummel GmbH, Ludwigsburg, Germany

[21] Appl. No.: 600,113

[22] Filed: Feb. 12, 1996

[30] Foreign Application Priority Data

Feb. 10, 1995 [DE] Germany ............... 195 04 382.0

[51] Int. Cl.$^6$ .................... F02B 27/02; F02M 35/10
[52] U.S. Cl. ................................. 73/118.2; 123/432
[58] Field of Search .................... 73/116, 117.2, 73/117.3, 118.1, 118.2; 364/431.05; 123/432

[56] References Cited

U.S. PATENT DOCUMENTS

| | | | |
|---|---|---|---|
| 2,105,343 | 1/1938 | Briggs . | |
| 3,964,448 | 6/1976 | Eda | 133/8.45 |
| 4,084,549 | 4/1978 | Satow | 123/217 |
| 4,164,205 | 8/1979 | Asanomi et al. | 123/117 R |
| 4,181,105 | 1/1980 | Takemoto et al. | 123/117 A |
| 4,244,333 | 1/1981 | Matsumoto | 123/432 |
| 4,317,438 | 3/1982 | Yagi et al. | 123/432 |
| 4,515,127 | 5/1985 | Katsuoka | 123/430 |
| 4,572,478 | 2/1986 | Vogler et al. | 251/305 |
| 4,766,866 | 8/1988 | Takii et al. | 123/432 |
| 4,834,048 | 5/1989 | Adamis et al. | 123/432 |
| 4,850,371 | 7/1989 | Broadhurst et al. | 128/719 |
| 4,860,706 | 8/1989 | Suzuki et al. | 123/337 |
| 4,907,547 | 3/1990 | Daly | 123/52 M |
| 5,018,972 | 5/1991 | Schreinemakers | 433/215 |
| 5,035,214 | 7/1991 | Daly et al. | 123/337 |
| 5,098,064 | 3/1992 | Daly et al. | 251/306 |
| 5,101,792 | 4/1992 | Koch | 123/456 |
| 5,167,211 | 12/1992 | Fukuma et al. | 123/308 |
| 5,379,732 | 1/1995 | Mavinahally et al. | 123/73 AA |

FOREIGN PATENT DOCUMENTS

| | | |
|---|---|---|
| 110 077 | 6/1984 | European Pat. Off. . |
| 137394 | 4/1985 | European Pat. Off. . |
| 182473 | 5/1986 | European Pat. Off. . |
| 384359 | 8/1990 | European Pat. Off. . |
| 544978 | 6/1993 | European Pat. Off. . |
| 640754 | 3/1995 | European Pat. Off. . |
| 2210720 | 8/1974 | France . |
| 3733441 | 12/1988 | Germany . |
| 3833846 | 4/1989 | Germany . |
| 3836550 | 5/1990 | Germany . |
| 3934906 | 11/1990 | Germany . |
| 4017066 | 12/1990 | Germany . |
| 4311744 | 10/1994 | Germany . |
| 4329522 | 3/1995 | Germany . |
| WO 87/05965 | 5/1986 | WIPO . |
| WO 91/13245 | 9/1991 | WIPO . |

OTHER PUBLICATIONS

Abstract of Published Japanese Patent Application No. JP 60-42702.

*Primary Examiner*—George M. Dombroske
*Attorney, Agent, or Firm*—Evenson, McKeown, Edwards & Lenahan P.L.L.C.

[57] ABSTRACT

An intake system for an internal combustion engine includes first and second inlet passages for each cylinder of the internal combustion engine. The second inlet passage is provided with a butterfly valve arrangement integrated into the flange area of the intake manifold for selectively closing or opening the passage, and a drive unit is provided for operating this valve arrangement depending on the operational state of the internal combustion engine.

15 Claims, 3 Drawing Sheets

AIR INTAKE FOR AN INTERNAL COMBUSTION ENGINE

BACKGROUND OF THE INVENTION

This invention relates to an intake system for an internal combustion engine having at least one cylinder, the intake system comprising a first and a second inlet passage for each cylinder, a butterfly valve arrangement for closing the second inlet passage of each cylinder, and a control system for the butterfly valve assembly.

An intake system of this type is disclosed, for example, in Published European Patent Application No. EP 544,978. In this system, a flange piece is inserted between the intake manifold and the motor block of an internal combustion engine. This flange piece contains butterfly valves which close or open the second inlet passage of each cylinder. Such an arrangement serves, especially in lean-mix engines, for better swirling of the aspirated gases in the lower rpm range. However, this system is costly to manufacture, and it is also is difficult to assemble.

SUMMARY OF THE INVENTION

It is the object of the present invention to provide an intake system which will be less expensive to produce and less difficult to assemble.

This and other objects of the invention are achieved by providing an intake system for an internal combustion engine having at least one cylinder, said system comprising a flange area for mounting the intake system on a cylinder block of the internal combustion engine, and a first and a second inlet passage for each cylinder of the engine, a butterfly valve arrangement for closing the second inlet passages, and a control system for the butterfly valve arrangement, wherein the butterfly valve assembly is integrated into the flange area of the intake system.

An important aspect of the invention is the creation of a butterfly valve arrangement which is suitable for integration into the intake system. Care must be taken that the flange area which bears the gaskets for sealing the intake system to the motor block is not changed.

The system of the present invention is generally applicable wherever a plurality of butterfly valves are to be operated by a valve shaft.

The invention is distinguished by the fact that through appropriately configuring the flange area, i.e., by creating an integrated mounting, the valve system is located in the intake system in such a way that the flange function or fastening function is not interfered with.

In accordance with a further embodiment of the invention, the valve system comprises an operating shaft with butterfly valves arranged thereon and a mounting frame. The mounting frame serves to support the valve arrangement integrated into the intake system on the flange side. It is also possible, of course, without a mounting frame, to choose a method of fastening by which the valve arrangement can be fastened to the intake system by snap-fastening means.

In one embodiment of the invention, it is proposed to mount the butterfly valves for lateral displacement on the operating shaft. This has the advantage that inaccuracies due to thermal expansion or even manufacturing defects will not lead to any sticking of the valves in the inlet passage. Each valve thus adapts itself optimally to the circumstances of its inlet passage.

It is advantageous to journal the operating shaft so that the part of the intake system that is on the flange side forms a first half shell around the operating shaft and the other half shells are formed on the mounting frame. Additional bearing elements such as friction bearings or the like are usually unnecessary. However, they can be incorporated without difficulty by appropriately configuring the half shells to receive them.

In other embodiments the operating shaft is provided with a loop in the area of each butterfly valve. This loop or crank serves to support the butterfly valve and to transfer the rotational movement of the operating shaft to the butterfly valve.

As an alternative to the loop, the operating shaft can be flattened in the area of the butterfly valves. This flattening also permits the transfer of the rotation of the operating shaft to the butterfly valve.

Since the butterfly valves are usually made of plastic, they can be fastened on the operating shaft by a snap fastening method. This kind of fastening facilitates assembly and is not liable to give trouble.

As previously mentioned, the intake system is sealed to the motor block by an appropriate gasket. This gasket can simultaneously provide the seal between the flange area of the intake system and the mounting frame. Thus no additional sealing means are necessary for the mounting frame.

In order to axially position the operating shaft, one end of the shaft lies against an abutment. At the opposite end of the shaft, the mounting frame is equipped with a spring means. The purpose of this spring means is to hold the operating shaft in the desired position.

The operating shaft is preferably made of a metal material such as steel wire, for example. The torsion-spring action of the operating shaft is utilized for reliably shutting the second passages by the butterfly valves. The individual butterfly valves have a slight angular offset from one another. As a result of this angular offset the butterfly valve farthest from the actuating means will be the first one closed, and as the operating shaft continues to turn the butterfly valves that follow will also be closed by the actuating means. This arrangement assures that each butterfly valve will be in contact with its abutment, and that engine vibration will produce no vibration of the valves in the end position.

Due to the small diameter of the shaft, it is sufficiently elastic to compensate for any alignment error if the bearing points should not be properly aligned. Another advantage of the small shaft diameter is the low leakage losses around the bearing points between the induction passages.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
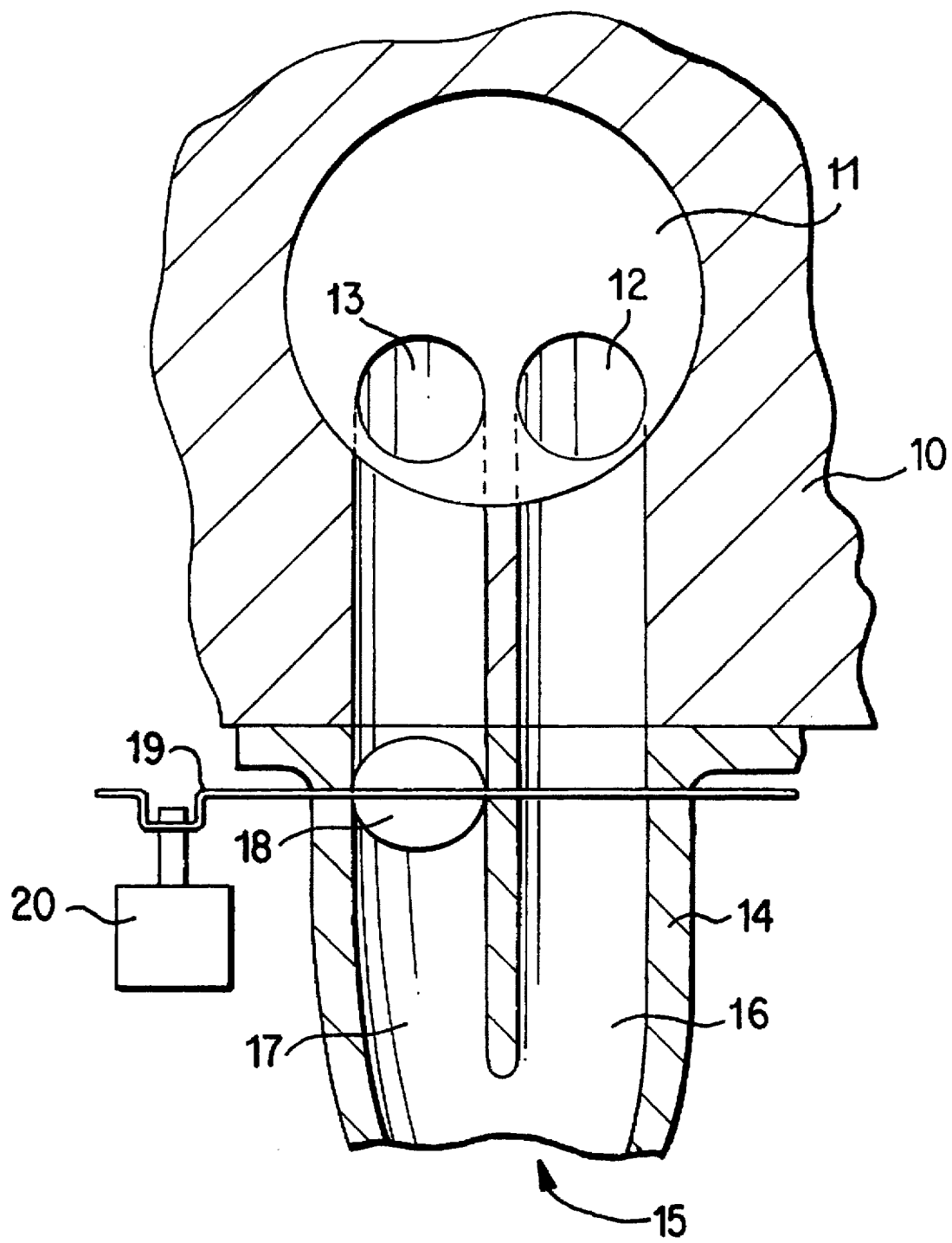
FIG. 1 is a schematic view of an intake system with two inlet passages.

The schematic representation in FIG. 1 shows a sectional view of a cylinder head 10 with a cylinder head chamber 11 and two inlets 12 and 13. An intake system 14 is flange-mounted on the motor block 10. This intake system comprises an induction passage 15 which divides into the induction passages 16 and 17. Induction passage 17 is provided with a butterfly valve 18. This butterfly valve is fastened on an operating shaft 19 which is controlled by a drive unit 20. To improve efficiency, especially in the lower rpm range of a lean-mix engine, the butterfly valve 18 is closed, and in the upper rpm range it is rotated to the open position shown in the figure.

Figure 2:
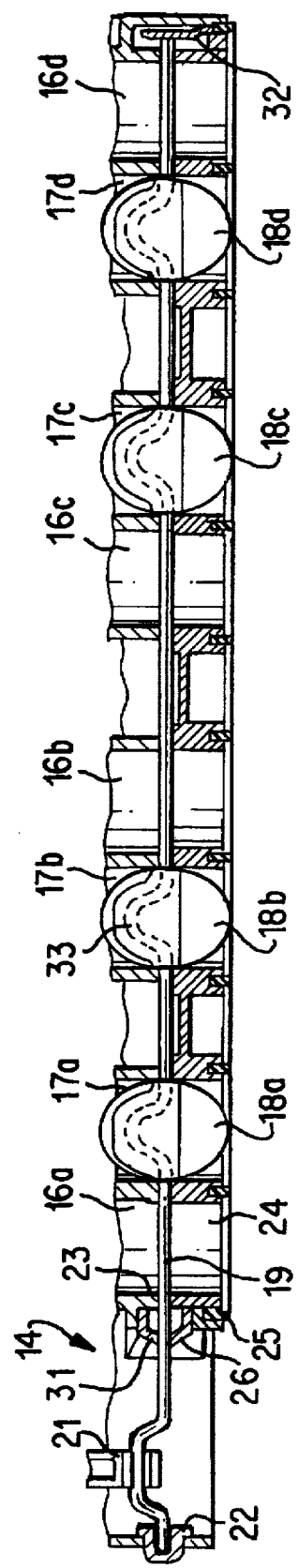
FIG. 2 is a sectional view of an intake system in the area of the butterfly valve system.

FIG. 2 shows an intake system in a sectional view taken through the butterfly valve assembly. The flange area of the intake assembly 14 contains the first induction passages 16a to 16d, as well as the second induction passages 17a to 17d. The butterfly valves 18a–18d are disposed in the induction passages 17a–17d and are mounted on an operating shaft 19. The left end of the operating shaft is coupled by a lever 21 to the drive unit 20 shown in FIG. 1. In order to journal the shaft 19 on the intake assembly 14, a bushed bearing 22 is provided at the left end. Also, the operating shaft 19 is supported on appropriately configured bearing halves or half shells 23 which are arranged adjacent each induction channel.

A mounting frame 24 is provided for mounting the operating shaft 19 and the entire valve arrangement. This mounting frame is situated on the side of the intake system facing the connecting flange, and at the same time it is provided with the gasket system 25. This gasket system 25 seals the intake system 14 against the cylinder head 10 and also seals the mounting frame 24 against the flange area of the intake assembly.

The butterfly valves 18a–18d are disposed on loops 33 formed in the operating shaft 19, the loops 33 providing for the transfer of the rotary movement of the operating shaft 19 to the butterfly valves 18a–18d.

In assembling the system, first the butterfly valves 18a–18d are mounted on the operating shaft while it is still outside of the intake system. Then the left end of the operating shaft is threaded through the opening 26, sealed in by an annular gasket 31, inserted into the sleeve bearing 22, and fixed in the illustrated position by setting the mounting frame 24 in place. On the right side of the mounting frame 24 is a spring 32. Spring 32 exerts an axial force on the operating shaft 19 in the direction of the bearing 22, so that after the operating shaft 19 is installed it will not move axially.

Figure 3:
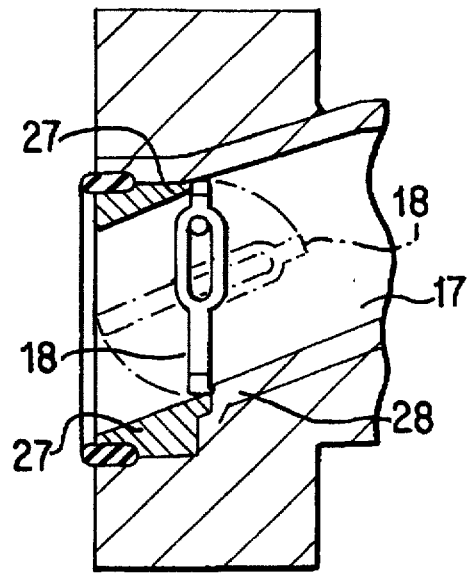
FIG. 3 is a sectional view of a butterfly valve.

FIG. 3 is a sectional view showing a single butterfly valve 18. In the closed position shown in the drawing, this butterfly valve is in contact with the sealing area 28 of the induction passage 17, and with the sealing area 27 of the mounting frame 24. In order to assure a reliable seal, the butterfly valve 18, which is made of plastic, can be manufactured by the so-called 2K-injection molding process with the sealing portion of the butterfly valve being made of an elastomer. A sealing lip can, of course, also be formed on the butterfly valve.

The portion shown in broken lines indicates the butterfly valve in the open position. Due to its shallow design, this valve presents only a small resistance area to the gas stream.

As shown here, the butterfly valve 18 comprises two halves which are welded or cemented together, and between which the operating shaft 19 is embedded in an axially displaceable manner.

Figure 4:
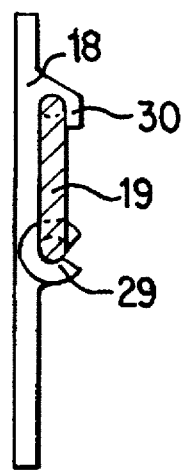
FIG. 4 is a view illustrating how the butterfly valve is mounted.

FIG. 4 shows a variant method of fastening a butterfly valve. The valve 18 in this case is constructed in one piece and has a partly open eye 29 and a lip 30. The operating shaft 19 is inserted into the lip and snapped into the open eye 29. This kind of mounting is easy to perform and constitutes a reliable fastening method.

Alternatively, the butterfly valve may be fastened to the shaft by other means. For example, the operating shaft could be provided with a flattened surface, and the valve secured to the flattened surface. In another example, the shaft could be formed in two halves, and the valve inserted between the two halves of the shaft. In yet another alternate example, snap fasteners could be used to fasten the valve to the shaft.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An intake system for an internal combustion engine having at least one cylinder, said system comprising a flange area for mounting the intake system on a cylinder block of the internal combustion engine, a first and a second inlet passage for each cylinder of the engine, a butterfly valve assembly for closing the second inlet passages, and a control system for the butterfly valve assembly, wherein the butterfly valve assembly comprises an operating shaft, and a plurality of butterfly valves mounted on the operating shaft angularly offset from one another, and wherein the butterfly valve assembly is integrated into the flange area of the intake system.

2. An intake system according to claim 1, wherein the butterfly valve assembly further comprises a mounting frame configured to support said operating shaft on both sides of each said butterfly valve.

3. An intake system according to claim 2, wherein the butterfly valve assembly comprises a plurality of butterfly valves secured to the operating shaft, each of said butterfly valves being laterally displaceable on the operating shaft independently of one another.

4. An intake system according to claim 2, wherein the operating shaft of the butterfly valve assembly is journaled between complementary first and second half shells, one of said half shells being formed in a face of the flange area of the intake system, and the other of said half shells being formed in the mounting frame.

5. An intake system according to claim 4, further comprising a gasket provided between the mounting frame and the flange area of the intake system, said gasket sealing the mounting frame to the flange area and sealing the flange area to the cylinder block of the internal combustion engine.

6. An intake system according to claim 4, wherein said face of the flange area of the intake system faces the cylinder block.

7. An intake system according to claim 6, wherein said mounting frame is arranged between said face of the flange area and said cylinder block.

8. An intake system according to claim 2, wherein the operating shaft is formed with a loop in the area of each butterfly valve for supporting the butterfly valves and for transmitting torque from the shaft to the butterfly valves.

9. An intake system according to claim 2, wherein the operating shaft is flattened in the area of the butterfly valves and the butterfly valves are supported on this flattened area.

10. An intake system according to claim 2, wherein the butterfly valves are fastened to the operating shaft by snap-fastening means.

11. An intake system according to claim 2, further comprising a gasket provided between the mounting frame and the flange area of the intake system, said gasket sealing the mounting frame to the flange area and sealing the flange area to the cylinder block of the internal combustion engine.

12. An intake system according to claim 2, wherein the mounting frame is provided with a spring means for exerting an axially directed force on the operating shaft to hold the operating shaft without free play in the axial direction.

13. An intake system according to claim 2, wherein the flange area of the intake system and the mounting frame are each provided with an abutment for each butterfly valve, said abutments being sealingly engaged by the respective butterfly valve when the valve is in closed position.

14. An intake system according to claim 1, wherein the operating shaft is configured as a torsion spring.

15. An intake system according to claim 1, wherein the butterfly valve assembly further comprises a mounting frame which supports said operating shaft on both sides of each of said butterfly valves.

* * * * *